(12) United States Patent
Kawano et al.

(10) Patent No.: US 6,274,526 B1
(45) Date of Patent: Aug. 14, 2001

(54) DIELECTRIC CERAMIC COMPOSITION FOR MICROWAVE

(75) Inventors: Takafumi Kawano; Koichi Fukuda, both of Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 09/716,237

(22) Filed: Nov. 21, 2000

(30) Foreign Application Priority Data

Nov. 25, 1999 (JP) .................................... 11-333714

(51) Int. Cl.$^7$ .................................... C04B 35/468
(52) U.S. Cl. ................................................ 501/139
(58) Field of Search ............................... 501/139

(56) References Cited

FOREIGN PATENT DOCUMENTS

| | | | | |
|---|---|---|---|---|
| 1-128309 | * | 5/1989 | (JP) | ................................. H01B/3/12 |
| 3-192606 | * | 8/1991 | (JP) | ................................. H01B/3/12 |
| 4-265269 | * | 9/1992 | (JP) | ................................. C04B/35/46 |
| 5-97508 | * | 4/1993 | (JP) | ................................. C04B/35/46 |
| 406080467 | * | 3/1994 | (JP) | ................................. C04B/35/46 |
| 08017243 | * | 1/1996 | (JP) | ................................. H01B/3/12 |

* cited by examiner

*Primary Examiner*—David Brunsman
(74) *Attorney, Agent, or Firm*—Young & Thompson

(57) ABSTRACT

A dielectric ceramic composition for microwave which comprises a basic composition represented by compositional formula: $2aBaO-bLn_2O_3-cBi_2O_3-2dTiO_2$, wherein $Ln_2O_3$ represents $(eNd_2O_3+fSm_2O_3+gEu_2O_3)$; $a+b+c+d=1$; and $e+f+g=1$, in which $0.0913<a\leq0.1429$, $0.2098<b<0.3003$, $0<c<0.0856$, $0.5714\leq d<0.6043$, $0.27<e<0.80$, $0.18<f<0.70$, $0<g<0.20$, and $0.15<a/d<0.25$.

2 Claims, No Drawings

DIELECTRIC CERAMIC COMPOSITION FOR MICROWAVE

BACKGROUND OF THE INVENTION

1. Field of the Invention

The present invention relates to a dielectric ceramic composition for microwave which has a high specific dielectric constant $\in_r$ and a large Qf value and of which the temperature coefficient $\tau_f$ of resonant frequency ($f_0$) can easily be controlled.

2. Description of the Related Art

With the recent rapid progress of size reduction and digitalization in electronic technology, particularly in the field of communication components using microwaves, such as comunications satellite systems, mobile phones, and portable personal telephones, a small-size, high-performance and high-reliability microwave resonator has been demanded.

Dielectric ceramics used in microwave resonators are required to have such characteristics as a high specific dielectric constant $\in_r$, a large Qf value, and of which the temperature coefficient $\tau_f$ of resonant frequency ($f_0$) can easily be controlled.

Known dielectric ceramics for microwave applications include $BaO$—$TiO_2$—$Nd_2O_3$—$Bi_2O_3$ ceramics (see Japanese Patent Laid-Open No. 102003/81) and $BaO$—$TiO_2$—$Sm_2O_3$—$Ce_2O_3$—$Bi_2O_3$ ceramics (see Japanese Patent Laid-Open No. 187162/87). The problems of these conventional materials are: that their Qf value is as low as 4000 to 6500 for use as a dielectric in microwave communication and that their frequency-temperature characteristics are not easy to control in conformity with various cavities.

Japanese Patent Laid-Open No. 169326/95 discloses $BaO$—$TiO_2$—$Ln_2O_3$ ceramics (wherein $Ln_2O_3$ represents $Nd_2O_3$ and $Pr_6O_{11}$) containing $Cr_2O_3$, which have a specific dielectric constant $\in_r$ of 91 to 93. However, their Qf value is low as 5700 to 6000, and the temperature coefficient $\tau_f$ of resonant frequency ($f_0$) is from 6 to 9 ppm/° C. Therefore, they are inapplicable to filters whose cavities are made of iron or copper and which have a large $\tau_f$.

SUMMARY OF THE INVENTION

An object of the present invention is to eliminate the problems associated with conventional dielectric cramics for microwave and to provide a dielectric ceramic composition for microwave which has a high specific dielectric constant $\in_r$ and a large Qf value, and of which the temperature coefficient $\tau_f$ of resonant frequency ($f_0$) can easily be controlled.

The present invention relates to a dielectric ceramic composition for microwave which comprises a basic composition represented by compositional formula: $2aBaO$—$bLn_2O_3$—$cBi_2O_3$—$2dTiO_2$, wherein $Ln_2O_3$ represents ($eNd_2O_3 + fSm_2O_3 + gEu_2O_3$); $a+b+c+d=1$; and $e+f+g=1$, in which $0.0913 < a \leq 0.1429$, $0.2098 < b < 0.3003$, $0 < c < 0.0856$, $0.5714 \leq d < 0.6043$, $0.27 < e < 0.80$, $0.18 < f < 0.70$, $0 < g < 0.20$, and $0.15 < a/d < 0.25$.

The present invention provides a dielectric ceramic composition for microwave which has a high specific dielectric constant $\in_r$ and a large Qf value and of which the temperature coefficient $\tau_f$ of resonant frequency ($f_0$) can easily be controlled.

DETAILED DESCRIPTION OF THE INVENTION

The grounds for limitations imposed on the composition of the present invention will be explained. In the compositional formula: $2aBaO$—$bLn_2O_3$—$cBi_2O_3$—$2dTiO_2$, wherein $Ln_2O_3$ represents ($eNd_2O_3 + fSm_2O_3 + gEu_2O_3$); $a+b+c+d=1$; and $e+f+g=1$), if a is less than 0.0913, the dielectric has a reduced Qf value. If it exceeds 0.1429, the dielectric constant is reduced. If b is less than 0.2098, the dielectric constant is reduced. If it is more than 0.3003, the Qf value is reduced. The presence of $Bi_2O_3$ increases the dielectric constant and lowers the sintering temperature. If c exceeds 0.0856, however, the Qf value is considerably reduced. If d is less than 0.5714, the dielectric constant is reduced, and if it exceeds 0.6043, the Qf value is reduced. If e is less than 0.27, the dielectric constant is reduced. If it is more than 0.80, the Qf value is reduced. If f is less than 0.18, the Qf value is reduced. If it is more than 0.70, the dielectric constant is reduced. Incorporation of $Eu_2O_3$ brings about a reduction in sintering temperature, but if g is more than 0.20, the dielectric constant is reduced. Where a/d is less than 0.15, the Qf value is reduced. If a/d is more than 0.25, the dielectric constant is reduced.

It is preferred for the dielectric ceramic composition of the present invention to further comprise $SiO_2$ as an auxiliary component. A preferred $SiO_2$ content (symbolized by "h") is less than 3% by weight based on the basic composition of the ceramic composition according to the present invention. Being added in an amount of less than 3% based on the basic composition, $SiO_2$ is effective in broadening the firing temperature range in which preferred dielectric characteristics can be secured. Addition of 3% or more of $SiO_2$ is unfavorable because both the dielectric constant and the Qf value are reduced.

The dielectric ceramic composition of the present invention is preferably prepared, for example, as follows. Raw materials providing barium oxide, neodymium oxide, samarium oxide, europium oxide, bismuth oxide, titanium oxide, and $SiO_2$ (auxiliary component) are weighed out and wet mixed together with a solvent, such as water or an alcohol. The solvent is removed, and the solid is ground to powder. The powder is uniformly mixed with an organic binder, such as polyvinyl alcohol, and the miture is dried, ground, and pressed under, e.g., 100 to 1000 kg/cm$^2$. The resulting body is fired in an oxygen-containing gas, such as air, at 1200 to 1500° C. to obtain the ceramic composition as desired.

The ceramic composition of the present invention is processed into a part of a dielectric resonator, a dielectric substrate, a multilayer ceramic device, and the like in a manner selected for the purpose. For example, the ceramic (after firing) is processed into appropriate shape and size, or the composition in a slurry form is formed into sheeting by a doctor blade process, or the sheet of the ceramic is laminated with an electrode layer.

The raw materials supplying barium, neodymium, samarium, europium, bismuth, titanium and silicon include not only their oxides, i.e., $BaO$, $Nd_2O_3$, $Sm_2O_3$, $Eu_2O_3$, $Bi_2O_3$, $TiO_2$, and $SiO_2$, but those capable of becoming the corresponding oxides on being fired, such as corresponding nitrates, caionates, hydroxides, chlorides, and organometallic compounds.

The present invention will now be illustrated in greater detail with reference to Examples. The following Examples are presented as being exemplary of the present invention and should not be considered as limiting.

EXAMPLE 1

Raw material mixed powder consisting of 0.2632 mol of $BaO$, 0.0971 mol of $Sm_2O_3$, 0.1397 mol of $Nd_2O_3$, 0.0263 mol of $Eu_2O_3$, 0.0263 mol of $Bi_2O_3$, 1.1579 mol of $TiO_2$ (basic composition), and 0.8 wt %, based on the basic composition, of $SiO_2$ (auxiliary component) was wet milled in a ball mill together with ethanol and Zr balls for 24 hours. The solvent was removed from the slurry, and the solid was ground. An adequate amount of a polyvinyl alcohol solution was added to the grinds and, after drying, formed into pellets of 10 mm in diameter and 4 mm in thickness, which were fired in air at 1370° C. for 2 hours.

The resulting ceramic composition was processed into a disc having a diameter of 0.8 mm and a thickness of 3 mm. The Qf value, specific dielectric constant $\epsilon_r$, and the temperature coefficient $\tau_f$ of a resonant frequency of from 2 to 5 GHz were obtained by a dielectric resonance method. The results obtained are shown in Table 2.

EXAMPLES 2 TO 10

BaO, $Sm_2O_3$, $Nd_2O_3$, $Eu_2O_3$, $Bi_2O_3$, $TiO_2$, and $SiO_2$ as an auxiliary component were mixed at the ratio shown in Table 1 below, formed under the same conditions as in Example 1, and fired in air at 1200 to 1400° C. for 2 hours to prepare dielectric ceramics. The characteristics of the resulting ceramics were evaluated with the same resonator as used in Example 1. The results obtained are shown in Table 2.

COMPARATIVE EXAMPLES 1 TO 7

BaO, $Sm_2O_3$, $Nd_2O_3$, $Eu_2O_3$, $Bi_2O_3$, $TiO_2$, and $SiO_2$ as an auxiliary component were mixed at the ratio shown in Table 1 below, formed, and fired under the same conditions as in Example 1 to prepare dielectric ceramics. The characteristics of the resulting ceramics were evaluated with the same resonator as used in Example 1. The results obtained are shown in Table 2.

TABLE 1

| | | 2a | b | e | f | g | c | 2d | h* | a/d |
|---|---|---|---|---|---|---|---|---|---|---|
| | | \multicolumn{9}{c|}{$2aBaO - bLn_2O_3 - cBi_2O_3 - 2dTiO_2 - hSiO_2$} |
| | | \multicolumn{9}{c|}{$eNd_2O_3 + fSm_2O_3 + gEu_2O_3$} |
| Example | 1 | 0.2632 | 0.2632 | 0.53 | 0.37 | 0.10 | 0.0263 | 1.1579 | 0.8 | 0.23 |
| | 2 | 0.2273 | 0.2273 | 0.53 | 0.37 | 0.10 | 0.0682 | 1.1818 | 0.8 | 0.19 |
| | 3 | 0.2439 | 0.2439 | 0.63 | 0.27 | 0.10 | 0.0488 | 1.1707 | 0.8 | 0.21 |
| | 4 | 0.2439 | 0.2439 | 0.45 | 0.45 | 0.10 | 0.0488 | 1.1707 | 0.8 | 0.21 |
| | 5 | 0.2361 | 0.2469 | 0.53 | 0.37 | 0.10 | 0.0488 | 1.1723 | 0.8 | 0.20 |
| | 6 | 0.2204 | 0.2531 | 0.53 | 0.37 | 0.10 | 0.0490 | 1.1755 | 0.8 | 0.19 |
| | 7 | 0.2157 | 0.2549 | 0.53 | 0.37 | 0.10 | 0.0490 | 1.1765 | 0.8 | 0.18 |
| | 8 | 0.2632 | 0.2632 | 0.53 | 0.37 | 0.10 | 0.0263 | 1.1579 | 0.8 | 0.23 |
| | 9 | 0.2314 | 0.2488 | 0.53 | 0.37 | 0.10 | 0.0489 | 1.1733 | 0.8 | 0.20 |
| | 10 | 0.2632 | 0.2632 | 0.53 | 0.37 | 0.10 | 0.0263 | 1.1579 | 0 | 0.23 |
| Comparative Example | 1 | 0.2857 | 0.2857 | 0.10 | 0.90 | 0 | 0 | 1.1429 | 0.8 | 0.25 |
| | 2 | 0.2857 | 0.2857 | 0.50 | 0.50 | 0 | 0 | 1.1429 | 0.8 | 0.25 |
| | 3 | 0.2857 | 0.2857 | 0.90 | 0.10 | 0 | 0 | 1.1429 | 0.8 | 0.25 |
| | 4 | 0.2221 | 0.2221 | 0.59 | 0.41 | 0 | 0.0742 | 1.1853 | 3.0 | 0.19 |
| | 5 | 0.2221 | 0.2221 | 0.59 | 0.41 | 0 | 0.0742 | 1.1853 | 0.8 | 0.19 |
| | 6 | 0.2125 | 0.2561 | 0.27 | 0.63 | 0.10 | 0.0490 | 1.1771 | 0.8 | 0.18 |
| | 7 | 0.1714 | 0.2286 | 0.27 | 0.63 | 0.10 | 0.0857 | 1.2000 | 0 | 0.14 | h*: Percent by weight based on the basic composition ($BaO-Ln_2O_3-Bi_2O_3-TiO_2$)

TABLE 2

| | | $\epsilon_r$ | Qf (GHz) | $\tau_r$ (ppm/° C.) |
|---|---|---|---|---|
| Example | 1 | 87.0 | 7793 | 5.4 |
| | 2 | 89.4 | 7789 | -2.3 |
| | 3 | 88.0 | 7536 | 4.5 |

TABLE 2-continued

| | | $\epsilon_r$ | Qf (GHz) | $\tau_r$ (ppm/° C.) |
|---|---|---|---|---|
| | 4 | 88.4 | 7593 | -0.3 |
| | 5 | 87.0 | 8137 | -3.1 |
| | 6 | 86.8 | 8634 | 0.9 |
| | 7 | 85.1 | 7925 | -1.2 |
| | 8 | 86.6 | 7324 | -1.1 |
| | 9 | 88.9 | 8369 | 11.0 |
| | 10 | 86.5 | 7622 | 6.5 |
| Comparative Example | 1 | 81.7 | 6372 | -2.3 |
| | 2 | 83.2 | 7212 | 28.2 |
| | 3 | 84.5 | 6556 | 67.2 |
| | 4 | 83.0 | 5489 | -31.2 |
| | 5 | 82.9 | 4982 | 27.0 |
| | 6 | 77.0 | 5000 | 10.0 |
| | 7 | \multicolumn{3}{c|}{sintering failure} |

The invention being thus described, it will be obvious that the same may be varied in in many ways. Such variations are not to be regarded as a departure from the spirit and scope of the invention, and all modifications as would be obvious to one skilled in the art are intended to be included within the scope of the following claims.

What is claimed is:

1. A dielectric ceramic composition for microwave which comprises a basic composition represented by compositional formula: $2aBaO-bLn_2O_3-cBi_2O_3-2dTiO_2$, wherein $Ln_2O_3$ represents ($eNd_2O_3+fSm_2O_3+gEu_2O_3$); $a+b+c+d=1$; and $e+f+g=1$, in which $0.0913<a\leq0.1429$, $0.2098<b<0.3003$, $0<c<0.0856$, $0.5714\leq d<0.6043$, $0.27<e<0.80$, $0.18<f<0.70$, $0<g<0.20$, and $0.15<a/d<0.25$.

2. The dielectric ceramic composition according to claim 1, which further comprises $SiO_2$ in an amount of less than 3% by weight based on said basic composition.

* * * * *